UNITED STATES PATENT OFFICE.

GEORGE P. DIECKMANN, OF MASON CITY, IOWA, ASSIGNOR OF ONE-HALF TO HOMER B. HASBROUCK, OF MASON CITY, IOWA.

COMPOUND FOR WATERPROOFING CEMENT AND THE LIKE AND PROCESS OF MAKING SAME.

1,023,926.  Specification of Letters Patent.  Patented Apr. 23, 1912.

No Drawing.   Application filed March 20, 1911.   Serial No. 615,522.

*To all whom it may concern:*

Be it known that I, GEORGE P. DIECKMANN, a citizen of the United States, residing at Mason City, county of Cerro Gordo, and State of Iowa, have discovered and invented a certain new and useful Improvement in Compounds for Waterproofing Cement and the Like and the Process of Making the Same, of which the following is a description.

The object of my invention is to produce a composition or matter which may be added to cement, concrete or like cementitious material, to render the same waterproof, and that will not deleteriously affect the properties of the material to which it is added.

My invention consists first in the novel process for producing an insoluble water repelling product, and second, in the product of said process. The proper mixture of a small quantity of this product, say substantially 2%, with a suitable cement, renders the mortar or concrete made from said cement, after the latter is set, permanently impervious to water.

My invention further consists in the product of the above-named process, that is a cement rendered waterproof by a mixture of a small percentage of the above insoluble water repelling compound therewith.

In carrying the process of manufacturing my improved compound into effect, I take a suitable quantity of fats, oils or greases, either animal or vegetable, preferably fish oil, because of its cheapness, and saponify the same with a suitable alkali, preferably sodium hydrate. The resulting product consists of a sodium soap and glycerin. Without separating the soap and glycerin from the liquid in which they are suspended, I agitate or stir the same, and while so doing, add thereto a water solution of a soluble metallic salt, such as alum, copper salt, lead salt, zinc salt, iron salt, magnesium, strontium, barium, or other equivalents, preferably alum salts, because of the low cost. I dissolve this metallic salt in water, forming, when alum is used, a water solution of alum, which, when mixed with the saponified product, is suspended in the liquid with the soap. After this step is taken I then add a suitable quantity of preferably powdered calcium oxid, or its equivalent, to convert the resulting product into an insoluble powder, with or without the aid of external heat. If a suitable quantity of calcium oxid is employed, it will reduce the product to an insoluble powder without external heat. An excess of the calcium oxid may be employed to a limited extent without deleterious effect, cheapening the final product. This process, when properly carried out, as above set forth, results in what may be termed a powdered sodium aluminum calcium glycero soap.

In carrying my process into effect, I have secured satisfactory results in the following manner, and with the following proportions: Taking substantially 100 parts of fish oil, I saponify the same with substantially 10 parts of sodium hydrate dissolved in substantially 50 parts of water, producing a sodium soap and glycerin. Without separating the soap and glycerin from the liquid in which they are suspended, and while agitating or stirring the same, I add substantially 40 parts of alum dissolved in 150 parts of water. I then add substantially 400 parts of powdered calcium oxid, preferably freshly made and powdered, which, when thoroughly mixed with the previous compound, results in a mixture which, in the best form, is then of about the consistency of a putty or paste. Heat slowly develops on standing, and in the course of five or ten minutes the temperature is raised to about 70 deg. C. At this point steam escapes, and the temperature rapidly rises to a maximum of about 110 deg. C., the reaction generally taking not longer than about fifteen minutes. This gives a product of a dry insoluble water repelling powder, which will pass through a small mesh screen. When the process is properly carried out as above set forth, I have found that the resulting powder will practically all pass through a screen as small as even 200 mesh.

If the proportions of calcium oxid be reduced to any material extent it may be necessary to use some external heat to completely drive off the water and reduce the product to a dry powder, as above. This powder I call a sodium aluminum calcium glycero soap, as above stated. If substantially from 1% to 3%, preferably about 2%, of this complex salt is added to cement, and the latter used in the usual manner, it renders the latter, when properly set, permanently waterproof. That the resulting powder, the product of my process, is a complex salt, as above set forth, is clearly shown by suitable chemical tests. As a result of the first and second stages of the process, the product, as well as the sodium soap, is soluble in water, consequently that product is not an insoluble powder, and it is necessary to take the next step in the process in order to obtain an insoluble powder capable of waterproofing cement. When the powdered calcium oxid, or its equivalent, is added in the manner described, the complex salt above described is produced. This is clearly shown from the fact that, first, it is an insoluble compound, of water repelling action. It is impossible to derive from this finished product any element or soluble metallic salt that was used in the manufacture. If the aluminum, or other soluble metallic salt which may have been used, was not combined in this complex salt, it would be possible to treat this powder with water and dissolve it. Chemical analysis show that there is no aluminum or other soluble metallic salts dissolved when the finished powder is treated with cold or hot water. This shows that a chemical reaction has taken place, and that the alum, or other soluble metallic salts which may have been used instead of alum as its equivalent, has combined chemically, because no longer in the soluble form in which it was added. Tests made on this final product for alum or other metallic salts by decomposing it with mineral acids and by chemical analysis, shows this powder contains alum or other soluble metallic salts, which may have been used as a substitute or equivalent for the alum in the manufacture.

Second, if the amount of calcium oxid used, or its equivalent, is just sufficient to form the reaction described, and no excess is employed, no lime salt is found in the filtrate by treating with cold or hot water, but by decomposing this complex salt with mineral acid, we get a positive test for the presence of calcium. These tests clearly indicate that the calcium oxid is no longer in the form in which it was added, but is in chemical combination with the soap, glycerin, sodium and aluminum. This finished product also gives a strong test for sodium, showing sodium to be present. Following this process through carefully, we find that while glycerin has been formed in the saponification process, it has not been eliminated and is present in the complex salt, or final product. By treating this final product with mineral acids we separate out a fatty acid, showing the presence of soap. For the above reasons it is evident that our final product may properly be called an insoluble sodium aluminum calcium glycero soap, as above stated. Satisfactory results may also be secured by mixing the soluble metallic salt and the calcium oxid, or its equivalent, in a dry state, to the soap and glycerin resulting from the combination of the sodium hydrate, or its equivalent, with the oil. In such case, more water may be employed in preparing the hydrate. After many and repeated experiments with both, however, I prefer to employ the process first described in which the water solution of the salt is used, although the resulting product is substantially the same.

By the use of the word "oil" in the claims, I wish to be understood as including fats, oils or greases, whether animal or vegetable, that will saponify. Also by the term "soluble metallic salts", I include alum salt or other equivalent salt, giving substantially the same results in the process named.

For the purpose of keeping the product within suitable commercial limits, I prefer to use the cheaper materials, such as fish oils, alum and calcium oxid, while an excess of the latter over the quantity necessary to bring about the perfect chemical reactions described, may be employed within reasonable limits without deleteriously effecting the product for the purpose set forth.

What I claim as new and desire to secure by Letters Patent is:—

1. The herein described process consisting in first saponifying an oil with a suitable alkali, second mixing therewith a water solution of a soluble metallic salt, and third mixing therewith a quantity of calcium oxid and expelling the water from the mixture, producing a dry, insoluble, water repelling powder.

2. The process of producing an insoluble, water repelling substance, consisting in mixing a suitable alkali dissolved in water, with a saponifiable oil, and then mixing therewith a soluble metallic salt and calcium oxid, and expelling the water from the mixture and reducing the whole to a powder.

3. The process of producing an insoluble, water repelling substance, consisting in the mixture of sodium hydrate dissolved in water with a saponifiable oil, and while agitating the same, adding thereto a water solution of a soluble metallic salt, and finally adding to the mixture thus produced, powdered calcium oxid and expelling the water from the product.

4. The process of producing an insoluble, water repelling substance consisting in mixing substantially ten parts of sodium hydrate dissolved in fifty parts of water with one hundred parts of fish oil, then while agitating the same adding thereto forty parts of alum dissolved in one hundred and fifty parts of water, and finally adding to the product thus formed a suitable quantity of powdered calcium oxid and expelling the water from the product, substantially as and in the proportions set forth.

5. A composition of matter, comprising the combination of a soluble alkali, a saponifiable oil, a soluble metallic salt and calcium oxid, substantially as set forth.

6. An insoluble water repelling powder, comprising the combination of sodium hydrate, a saponifiable oil, a soluble metallic salt, and calcium oxid, substantially as set forth.

7. An insoluble water repelling powder, comprising the combination of substantially 100 parts fish oil, 10 parts of sodium hydrate, 40 parts of alum and 400 parts of powdered calcium oxid, substantially as set forth.

8. The process of rendering cement waterproof, consisting in mixing therewith a small percentage of a water repelling powder, consisting substantially of a mixture of a water solution of a soluble alkali with a saponifiable oil to which has been added a soluble metallic salt and calcium oxid, and the water expelled therefrom.

9. A composition of matter, comprising the combination of cement with a powder, comprising a mixture of a soluble alkali, a saponifiable oil, a soluble metallic salt and calcium oxid, substantially as set forth.

In testimony whereof, I have hereunto signed my name in the presence of two subscribing witnesses.

GEORGE P. DIECKMANN.

Witnesses:
A. K. LOGEMANN,
JOE E. MEYER.

Copies of this patent may be obtained for five cents each, by addressing the "Commissioner of Patents, Washington, D. C."